United States Patent
Bal et al.

(10) Patent No.: US 10,764,683 B2
(45) Date of Patent: Sep. 1, 2020

(54) AUDIO HUB

(71) Applicant: BOSE CORPORATION, Framingham, MA (US)

(72) Inventors: Teoman Bal, Hudson, MA (US); Ryan Boyle, Hudson, MA (US); Mark E. Dukeshire, Nashua, NH (US); Daniel B. Pierson, Framingham, MA (US); Naganagouda B. Patil, Ashland, MA (US)

(73) Assignee: BOSE CORPORATION, Framingham, MA (US)

(*) Notice: Subject to any disclaimer, the term of this patent is extended or adjusted under 35 U.S.C. 154(b) by 0 days.

(21) Appl. No.: 16/141,018

(22) Filed: Sep. 25, 2018

(65) Prior Publication Data

US 2019/0098408 A1   Mar. 28, 2019

Related U.S. Application Data

(60) Provisional application No. 62/563,166, filed on Sep. 26, 2017.

(51) Int. Cl.
*H04R 3/12* (2006.01)
*G06F 3/16* (2006.01)
*H04R 5/04* (2006.01)

(52) U.S. Cl.
CPC ............. *H04R 3/12* (2013.01); *G06F 3/162* (2013.01); *G06F 3/165* (2013.01); *G06F 3/167* (2013.01); *H04R 5/04* (2013.01); *H04R 2420/07* (2013.01); *H04R 2499/13* (2013.01)

(58) Field of Classification Search
CPC .................................. H04R 3/12; G06F 3/162

USPC ........ 381/80, 300, 302, 77, 86, 89; 455/421, 455/569.1, 570
See application file for complete search history.

(56) References Cited

U.S. PATENT DOCUMENTS

| | | | |
|---|---|---|---|
| 8,483,775 B2* | 7/2013 | Buck ................... | H04M 1/6083 455/569.2 |
| 8,824,697 B2 | 9/2014 | Christoph | |
| 9,386,381 B2* | 7/2016 | Tehrani ............... | H04R 25/554 |
| 9,424,828 B2* | 8/2016 | Warkentin ........... | G10K 11/178 |

(Continued)

OTHER PUBLICATIONS

International Search Report and Written Opinion from corresponding International Application No. PCT/US2018/052574 dated Jan. 3, 2019.

(Continued)

*Primary Examiner* — William J Deane, Jr.
(74) *Attorney, Agent, or Firm* — Lando & Anastasi, LLP

(57) ABSTRACT

Systems and methods are provided for distributing audio. An audio system is provided that includes one or more audio interfaces, at least one of which is a wireless audio interface. An audio hub couples to the one or more audio interfaces and detects the presence of one or more headphones coupled to the wireless audio interfaces. The audio hub selectively establishes communication channel(s) to convey audio content between a plurality of devices coupled to the audio interfaces. The plurality of devices may include one or more headphones, an infotainment head unit, a microphone, and a speaker. Accordingly, headphone users may hold conversations with each other and/or other occupants of a vehicle, and various users may share audio content with headphone users and/or other occupants of a vehicle.

20 Claims, 9 Drawing Sheets

(56) References Cited

U.S. PATENT DOCUMENTS

| | | | | |
|---|---|---|---|---|
| 9,591,396 B2* | 3/2017 | Lee | ............... | B60W 50/14 |
| 9,820,323 B1 | 11/2017 | Young et al. | | |
| 2011/0022204 A1* | 1/2011 | Hatfield | ............. | H04M 1/6025 |
| | | | | 700/94 |
| 2014/0058662 A1* | 2/2014 | Tachibana | ............. | G01C 21/00 |
| | | | | 701/428 |
| 2015/0031352 A1* | 1/2015 | Yi | ............... | G01C 21/206 |
| | | | | 455/420 |
| 2015/0365771 A1* | 12/2015 | Tehrani | ............... | H04R 25/554 |
| | | | | 381/315 |
| 2016/0196108 A1* | 7/2016 | Selig | ............... | G06F 3/165 |
| | | | | 700/94 |
| 2016/0234870 A1* | 8/2016 | Borges | ............... | H04L 67/12 |
| 2019/0075394 A1* | 3/2019 | Mackay | ............... | H04H 60/04 |

OTHER PUBLICATIONS

Messenbaugh, C. "Shouting Match: Honda CabinTalk Vs. Toyota Driver Easy Speak", Cars.com (Dec. 7, 2017), retrieved from the Internet: <https://www.cars.com/articles/shouting-match-honda-cabintalk-vs-toyota-driver-easy-peak-1420698281460/>.

\* cited by examiner

AUDIO HUB

CROSS REFERENCE TO RELATED APPLICATIONS

This application claims priority under 35 USC § 119(e) to U.S. Provisional Patent Application Ser. No. 62/563,166, titled "VEHICLE AUDIO DISTRIBUTION HUB," filed Sep. 26, 2017, which is incorporated by reference herein in its entirety for all purposes.

BACKGROUND

Various environments make it difficult for individuals to communicate or carry on a conversation, due to noise, proximity, or other factors. For example, noise or distance between individuals may encumber communication in transportation centers, airplanes, trains, factory floors, etc. In some environments, an individual may be wearing headphones, e.g., for noise cancellation and/or to consume various audio content, which may make it difficult to hear a second individual trying to speak to him/her. For example, kids in the backseat of the family car may be watching a movie on a tablet or listening to music from a media device, and may be using headphones and may not hear a parent call out their name. Accordingly, there is a need for audio distribution capability in various environments and scenarios.

SUMMARY

Systems and methods disclosed herein are directed to audio systems and methods that distribute audio to accommodate communication and/or sharing of audio content among a number of users.

According to one aspect, an audio system is provided that includes an audio input configured to receive an input signal from a microphone, the input signal including audio content, a plurality of short-range wireless audio interfaces, each of the short-range wireless audio interfaces configured to couple wirelessly to an audio device and to provide an output signal for rendering into an acoustic signal by the audio device, and a controller coupled to the audio input and the plurality of wireless audio interfaces and configured to receive the input signal and to selectively provide the audio content in the output signal to one or more of the plurality of short-range wireless audio interfaces.

Some examples include an audio output configured to provide a second output signal to a loudspeaker, the controller being further configured to selectively receive a second input signal from a selected one of the plurality of short-range wireless audio interfaces and to provide the second output signal to the audio output based upon the second input signal.

According to various examples, the controller is further configured to selectively convey audio signals between a plurality of audio devices, each of the plurality of audio devices coupled to at least one of the plurality of short-range wireless audio interfaces. The controller may be further configured to store a name associated with one or more of the plurality of audio devices and/or one or more of the plurality of short-range wireless audio interfaces, and to accept a user selection of one or more of the names from a user interface, and to selectively convey the audio signals between the plurality of audio devices based upon the user selection. The user selection of one or more of the names from the user interface may include at least one of voice recognition of the one or more names or selection of the one or more names via a touchscreen, in various examples.

In certain examples, one or more of the plurality of short-range wireless audio interfaces is a Bluetooth interface. In certain examples, conveying an audio signal to and/or from one or more of the plurality of short-range wireless audio interfaces may use a hands-free profile (HFP). In certain examples, conveying an audio signal to and/or from one or more of the plurality of short-range wireless audio interfaces may use an advanced audio distribution profile (A2DP).

Various examples include an infotainment unit of an automobile, the microphone configured to be mounted in the automobile, the controller being coupled to the infotainment unit, and the controller being further configured to selectively convey audio signals between a plurality of devices selected from a group comprising the microphone, any of the plurality of short-range wireless audio interfaces, and the infotainment unit.

In certain examples, the controller is coupled to the plurality of short-range wireless audio interfaces via an audio bus.

In some examples, the audio input is a wireless audio interface and the controller is coupled to the microphone by the wireless audio interface.

According to another aspect, an audio system is provided that includes one or more audio interfaces, at least one of the one or more audio interfaces configured to couple to one or more wireless audio interfaces, and an audio hub coupled to the one or more audio interfaces, the audio hub configured to detect a presence of one or more headphones via the one or more wireless audio interfaces and to establish a communication channel between a plurality of devices selected from a group comprising the one or more headphones, an infotainment head unit, a microphone, and a speaker, and to convey audio content between the plurality of devices.

In certain examples, one or more of the audio interfaces is a Bluetooth interface. In certain examples, conveying the audio content to and/or from one or more of the plurality of devices may use a hands-free profile (HFP). In certain examples, conveying the audio content to and/or from one or more of the plurality of devices may use an advanced audio distribution profile (A2DP).

In certain examples, at least one of the one or more headphones may be in wireless communication with a personal device, wherein the plurality of devices is selected from the group further comprising the personal device.

In some examples, the audio hub may be in further communication with a plurality of fixed speakers in a vehicle, wherein at least one of the one or more headphones is in wireless communication with a personal device, wherein the plurality of devices is selected from the group further comprising the personal device and the plurality of fixed speakers, and wherein conveying audio content further comprises transmitting audio from the personal device to at least some of the plurality of fixed speakers.

In certain examples, conveying the audio content via the audio hub comprises transmitting audio between the microphone and/or the speaker and one, some, or all of the one or more headphones.

According to some examples, conveying the audio content via the audio hub comprises transmitting first audio between the one or more headphones while second audio is transmitted between an infotainment head unit and the speaker, the first audio being different from the second audio.

In various examples, conveying the audio content via the audio hub comprises transmitting first audio between the microphone, the speaker, and at least a first headphones of the one or more headphones; and transmitting second audio between the one or more headphones other than the first headphones, the first audio being different from the second audio.

According to another aspect, a method for distributing audio that includes an audio hub, a wireless interface, a microphone configured to pick up a user's voice, and a speaker located proximal to an ear of the user, is provided. The method includes detecting a presence of one or more headphones, via the wireless interface, establishing respective bi-directional wireless communication channels between each of the one or more headphones and the hub, and transmitting audio via the audio hub between a plurality of devices selected from a group comprising an infotainment head unit, the microphone, the speaker, and the one or more headphones.

In certain examples, the wireless interface is a Bluetooth interface and establishing respective bi-directional wireless communication channels between one or more of the headphones and the hub uses one of a hands-free profile (HFP) or an advanced audio distribution profile (A2DP).

In some examples, at least one of the one or more headphones may be in wireless communication with a personal device, wherein the plurality of devices is selected from the group further comprising the personal device, and wherein transmitting audio via the audio hub further comprises transmitting audio from the personal device to at least one of the one or more headphones.

In some examples, at least one of the one or more headphones is in wireless communication with a personal device, wherein the plurality of devices is selected from the group further comprising the personal device, and wherein transmitting audio via the audio hub further comprises transmitting audio from the personal device to the speakers.

In certain examples, the audio hub may be in further communication with a plurality of fixed speakers in a vehicle, wherein at least one of the one or more headphones is in wireless communication with a personal device, wherein the plurality of devices is selected from the group further comprising the personal device and the plurality of fixed speakers, and wherein transmitting audio via the audio hub further comprises transmitting audio from the personal device to at least some of the plurality of fixed speakers.

In various examples, transmitting audio via the audio hub comprises transmitting audio between the microphone and the speaker and one, some, or all of the one or more headphones.

In some examples, transmitting audio via the audio hub comprises transmitting first audio between the one or more headphones while second audio is transmitted between an infotainment head unit and the speaker, the first audio being different from the second audio.

In some examples, transmitting audio via the audio hub comprises transmitting first audio between the microphone, the speaker, and at least a first headphones of the one or more headphones; and transmitting second audio between the one or more headphones other than the first headphones, the first audio being different from the second audio.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the invention. In the figures, identical or nearly identical components illustrated in various figures may be represented by a like numeral. For purposes of clarity, not every component may be labeled in every figure. In the figures.

DETAILED DESCRIPTION

Aspects of the present disclosure are directed to systems and methods of establishing audio distribution between various users, any of whom may be using headphone or other audio reproduction devices and/or may be out of range (e.g., out of earshot) and/or under other conditions that may otherwise make it difficult for the users to hear each other.

Figure 1:
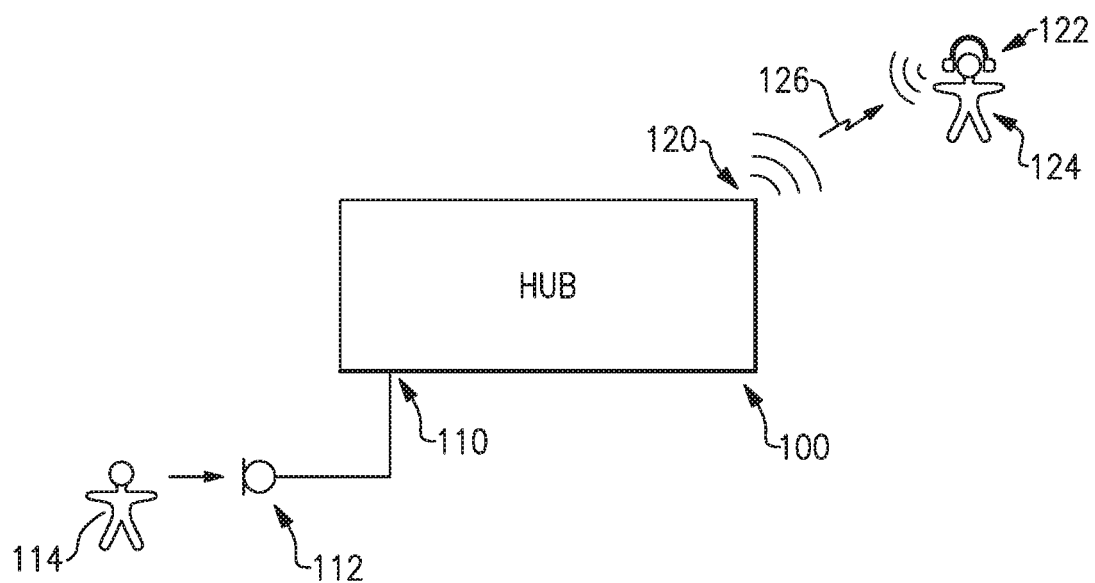
FIG. 1 is a schematic diagram of an example audio hub.

FIG. 1 illustrates an example audio hub 100 that includes an audio input 110 to receive an audio signal, e.g., via a microphone 112, from a first user 114 and an audio output 120 to provide the audio signal (or a variation thereof), e.g., via a headphone 122 to a second user 124.

In some examples, the audio input 110 may be coupled to a microphone 112 to receive acoustic signals from the first user 114, e.g., when the user speaks, and to provide the audio signal to the audio input 110. The audio input 110 may be wired (as shown), and may include the microphone 112, or may include one or more of various connectors or couplers, (e.g., RCA jack, ¼" inline jack, ⅛" inline jack, XLR jack, an audio bus connector, etc.), and may be mono, stereo, or otherwise. In some examples, the audio input 110 may be, e.g., a short-range wireless interface, such as a Bluetooth interface. The audio input 110 may be configured to receive an audio signal in any of various forms, such as electrical or optical, digital or analog, and in time domain or frequency domain, as will be understood by one of skill in the art.

In some examples, the audio output 120 may be coupled to a headphone 122 to provide an acoustic signal to the second user 124. The audio output 120 may be wired and/or may include a wireless link 126 (as shown). For example, the audio output 120 may include a Bluetooth interface that couples with an accordant Bluetooth interface associated with the headphone 122. In various examples, the audio output 120 may be coupled to a short-range wireless interface, such as a Bluetooth interface, having a range on the order of 200 feet or less. The audio output 120 may be coupled to the wireless interface by a wired connection, which may include an audio bus. The audio output 120 may be configured to provide an output audio signal in any of various forms, such as electrical or optical, digital or analog, and in time domain or frequency domain, as will be understood by one of skill in the art.

While the example shown illustrates a headphone 122, any of various types and form factors of acoustic devices may be substituted. For example, the audio hub 100 may provide audio at an output 120 coupled to any of various audio device, such as on-ear or over-the-ear headphone, in-ear or around-the-ear headphone (e.g., earbud, hearing aid), open acoustic device (e.g., user worn, about the neck or shoulders), associated with other devices (e.g., glasses, headgear, etc.), or other form factors, including portable speakers and the like, associated with the second user 124. In some examples, an audio device associated with the second user 124 may be binaural or monaural (e.g., a one-sided headset). In various examples, the audio device associated with the second user 124, e.g., the headphone 122, may include components that provide acoustic input, such as a microphone or other transducing equipment, e.g., intended to pick up vocal activity of the second user 124.

In some examples in accord with systems and methods described herein, a multi-channel audio distribution hub may be implemented as a multi-channel Bluetooth device that includes a software suite for enabling multi-way conversations between users, such as occupants of a home or office. In some examples, the multi-channel audio distribution hub may be coupled to various user devices, further audio hubs, and/or sound systems, and may be coupled to such components via various interfaces, such as Bluetooth, various audio bus types, a universal serial bus (USB) interface, or various networks, wired or wireless (e.g., wi-fi). Accordingly, various smart devices (e.g., smartphones, tablets, etc.) may be coupled to the audio hub via a local area network (LAN), such as a wireless LAN. In various examples, such smart devices may provide a user interface to the audio hub via an app, and/or may provide connectivity to a Bluetooth headphone or similar. Various headphones may, in turn, be connected to the audio hub and may include further Bluetooth connections to respective smartphones, tablets, etc. (user's personal devices). All the Bluetooth connections may be active and bi-directional, enabling multiple paths between connected devices. In such a multi-channel Bluetooth architecture, connected devices may serve both as clients and sources, and all connections can be active concurrently, as opposed to conventional Bluetooth systems that typically have only one active Bluetooth channel at a time.

In some examples in accord with systems and methods described herein, a multi-channel audio distribution hub may be implemented as a multi-channel Bluetooth device that includes a software suite for enabling multi-way conversations between users, such as occupants of a vehicle in some examples. In some examples, the multi-channel audio distribution hub uses an automotive audio bus (A2B) or universal serial bus (USB) interface to connect to an amplifier, such as associated with an infotainment or head unit of an automobile, and may use dedicated Bluetooth active channels to connect to a driver's smartphone and to Bluetooth headphones of various occupants of the vehicle. Each pair of headphones may, in turn, be connected via further Bluetooth connections to respective smartphones, tablets, etc. (user's personal devices). All the Bluetooth connections may be active and bi-directional, enabling multiple paths between connected devices. In such a multi-channel Bluetooth architecture, connected devices may serve both as clients and sources, and all connections can be active concurrently, as opposed to conventional Bluetooth systems that typically have only one active Bluetooth channel at a time.

A software suite of multi-channel audio distribution hub (s) described herein may enable audio streams (e.g., satellite or terrestrial) to be directed from an infotainment head unit or other audio source to any combination of headphones coupled to the audio distribution hub, and vice versa. Accordingly, users of the headphones may listen to the same audio content that is being presented to a driver in a vehicle, for example. The audio distribution hub may also enable an audio stream to be directed from an application running on any coupled device, such as a smartphone, or an audio stream being processed through any of the coupled headphones, to other outputs, such as to the infotainment unit for distribution to vehicle speakers. In this manner, personal audio streams may be shared between vehicle occupants freely and interchangeably between all sources and clients. Accordingly, such an audio distribution hub may provide an integrated experience that improves vehicle hospitality by enabling occupants to listen to their own or shared content; providing the connectivity to enable seamless communication with other vehicle occupants when they want, and privacy when they don't, without removing or donning their headphones to make such a transition.

In one example scenario, an infotainment head unit may have a touchscreen display, and a software suite of the audio distribution hub may provide, on the touchscreen display, a graphical user interface through which a driver of the vehicle can selectively identify occupants of the vehicle to have a conversation with. The driver may selectively start a conversation with one, some, or all of the vehicle occupants. At any point during the conversation, the driver may add or drop participants to the conversation. Each vehicle occupant who is a party to the conversation with the driver may communicate with the driver via a microphone and speaker of their respective headphones. The driver's voice may be picked up by a vehicle microphone and transmitted to selected headphones within the vehicle cabin, via the audio distribution hub. In some cases, the driver may hear the other users through one or more speakers associated with the vehicle, such as in the driver's seat headrest.

In another example scenario, an audio distribution hub is a virtual personal assistant (VPA)-enabled device configured to enable a user, e.g., the driver, to selectively start a conversation with one, some, or all of the other users, e.g., the vehicle occupants, by providing appropriate voice commands. In such a scenario, each pair of headphones coupled to the audio distribution hub may be uniquely identified by a spoken word.

In yet another example scenario, a user's smartphone may run a communications application through which the user can selectively start a conversation with one, some, or all of the other users.

Figure 2:
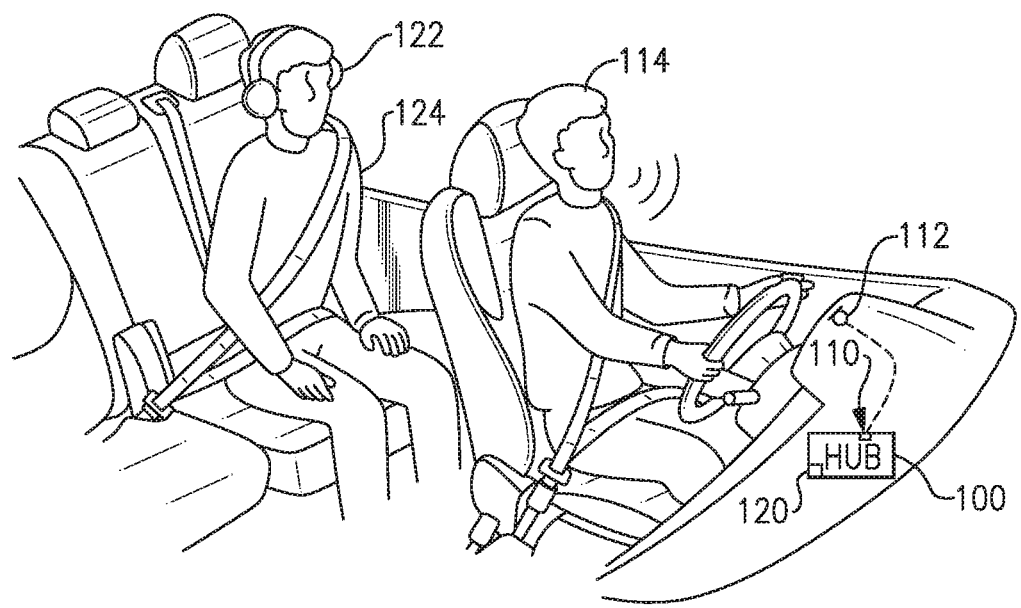
FIG. 2 is a perspective view of an example use case of the audio hub of FIG. 1.

In one example operating environment and mode of operation, and as illustrated in FIG. 2, the second user 124 may be an occupant or passenger in a vehicle, such as an automobile, and may be wearing headphones 122 having a Bluetooth connection to the audio hub 100. The microphone 112 may be positioned in the vehicle to pick up the voice of the first user 114. For example, the first user 114 may be a driver of the vehicle and the microphone 112 may be positioned as shown to at least pick up acoustic signals from the first user 114. Accordingly, the first user 114 may speak to the second user 124 via the audio hub 100, e.g., picked up by the microphone 112 and conveyed by the audio hub 100 via the wireless link 126 to the headphones 122. In this example, the first user 114, e.g., the driver, may be able to hear the second user 124 by regular acoustics, e.g., the driver can hear the passenger speak because the driver's ears are not blocked or otherwise encumbered. Accordingly, in this example, the audio hub 100 may provide an audio communications channel from a driver to a passenger, even though the passenger may be wearing headphones and may be out of eyesight of the driver. A return communications channel, from the passenger to the driver, may involve ordinary acoustics without assistance from the audio hub 100.

Figure 3:
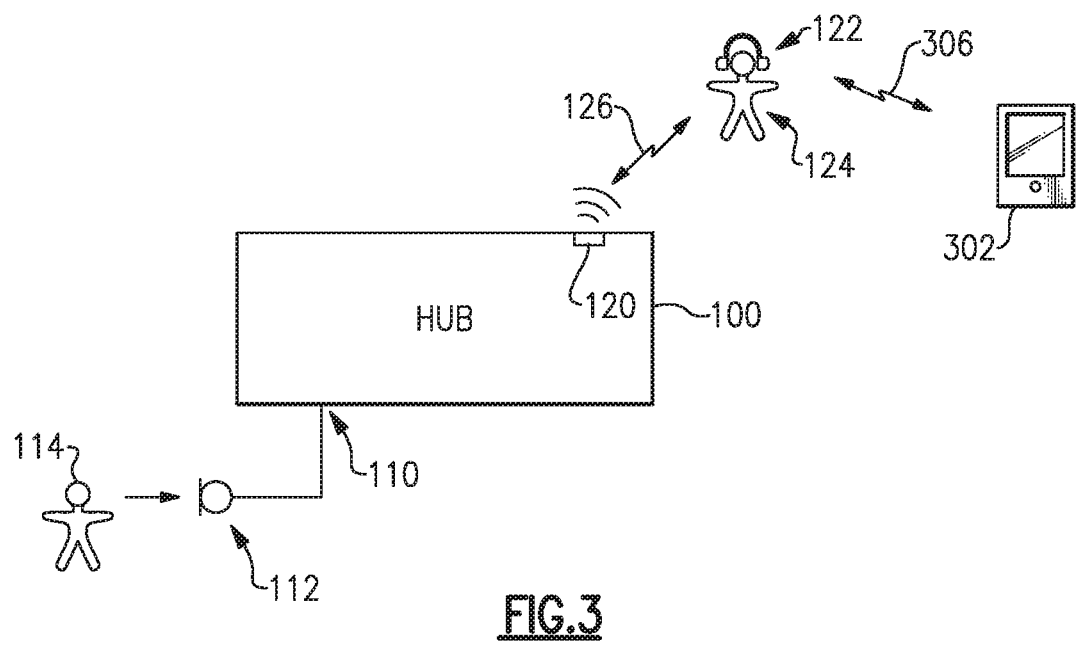
FIG. 3 is a schematic diagram of a further example audio hub.

With reference to FIG. 3, the headphone 122 may be further coupled to an additional device 302, such as a smartphone, tablet, laptop, or the like, that may be associated with the second user 124. For example, the device 302 may include a wireless interface, such as a Bluetooth interface, and the headphone 122 may be capable of simultaneous dual-connectivity, e.g., coupled to the audio hub 100 via the wireless link 126 and also coupled to the device 302 via a second wireless link 306. In various examples, either (or both) of the wireless links 126, 306, may be replaced with wired links.

With continued reference to FIG. 3, the second user 124 may use the headphone 122 to listen to audio content from the device 302, such as via a Bluetooth advanced audio distribution profile (A2DP), or similar, over the wireless link 306. The headphone 122 may also be coupled via the wireless link 126 to the audio hub 100, and the wireless link 126 may accommodate a Bluetooth hands-free profile (HFP) or similar, along with other profiles. When the first user 114 wants to communicate with the second user 124, in some examples, the first user 114 may indicate such by making a selection, e.g., via a user interface associated with the audio hub 100, and the audio hub 100 may initiate an HFP session with the headphone 122. Accordingly, in some examples, the audio hub 100 may appear to the headphone 122 to be a telephonic device, and initiating an HFP session may be equivalent to receiving an incoming call to which the headphone 122 may respond by answering, which may involve a prompt to and/or acceptance by the second user 124. The headphone 122 may therefore be a Bluetooth compliant device without requiring any special component or programming to be "aware" of the function(s) of the audio hub 100. In the instance that the headphone 122 is rendering an audio stream from the other device 302, the headphone 122 may pause such stream to accept the "call" from the audio hub 100, or may be configured to operate in various other ways.

In various examples, an audio hub may provide for communications between any of multiple users that may be coupled to the audio hub by wireless means, such as Bluetooth, wi-fi, or the like. For example, each of multiple passenger seats of a vehicle, such as an automobile, plane, train, etc. may have an occupant using a wireless (e.g., Bluetooth) audio device, such as headphones or their equivalent, and an example audio hub may allow any of the occupants to communicate to one or more other of the occupants, via their respective audio device, via their respective wireless link, and via the audio hub.

Figure 4:
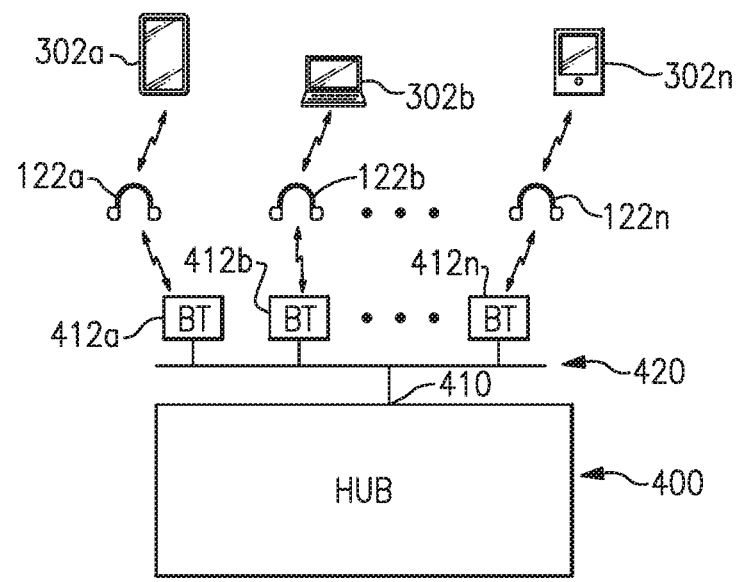
FIG. 4 is a schematic diagram of a further example audio hub.

For example, FIG. 4 illustrates an example audio hub 400 having an interface 410 coupled to one or more wireless interfaces 412. Each of the wireless interfaces 412 may be coupled to a wireless audio device, such as a headphone 122, associated with a user. In some instances, any of the user's audio devices may be further coupled to a further device 302, such as when any of the users may be listening to audio content from their respective device 302.

In some examples, each of the wireless interfaces 412 may be coupled directly to the audio hub 400 and/or may be incorporated with or into the audio hub 400, or may include one or more wireless interfaces 412 coupled to the audio hub 400 in combination with one or more wireless interfaces 412 incorporated in the audio hub 400. In various examples, an audio bus 420, such as an automotive audio bus (A2B) or similar, may couple one or more wireless interfaces 412 to the audio hub 400 and/or an audio bus may be incorporated into the audio hub 400. As shown in the example of FIG. 4, the audio hub 400 includes an interface 410 configured to couple to an audio bus 420. In various examples, the audio hub 400 may communicate with and/or control the wireless interfaces 412 via such an audio bus 420 or via additional or alternate communications channels with the wireless interfaces 412.

Accordingly, audio content may be conveyed to or from the audio hub 400 via the audio bus 420, and the audio hub 400 may distribute such audio content among various users. For example, various of the headphones 122 may be in use by a respective user, e.g., for noise cancellation, listening to audio content (music, movie, training video, etc.) from a respective device 302, or the like. A user associated with the headphone 122a may wish to communicate with a user associated with the headphone 122b, at some instance, and the audio hub 400 may accommodate a user selection (e.g., by the user of headphone 122a) to "call" the other user. Accordingly, the audio hub 400 may initiate two-way audio communication with the headphone 122b, which may include an acceptance of the call by the user of the headphone 122b, and may convey two-way audio communication between the user of headphone 122a and the user of headphone 122b.

In various examples, user action or input to initiate an audio communication link may take any of various forms. For instance, user input may be accommodated by the audio hub 400 by selection of options via a user interface, which may include a display, buttons, a touchscreen, keyboard, mouse, and the like. Additionally or alternatively, the audio hub 400 may incorporate or be coupled to components that perform voice recognition and/or speech-to-text decoding and may accommodate spoken commands. In some examples, various sensors (e.g., optical, video, accelerometers, positioning sensors, etc.) may detect movement of a user device (e.g., an audio device such as a headphone 122) and the audio hub 400, with the benefit of input signals from such sensors, may accommodate user movements as a selection to initiate a communication link. For instance, the user of the headphone 122b may turn and look at the user of the headphone 122a and the audio hub 400 may detect the motion and resulting spatial relationship between the headphones 122a, 122b and interpret such as a user selection to initiate a communication link between the headphones 122a, 122b. In various examples, any combination of user interfaces and user modes of selection as described above, or others, may be included.

With continued reference to the above example, the two users may be near each other or may be more remote, e.g., each within range of their respective wireless interface 412, and each wireless interface 412 may be a distance from each other as accommodated by the audio bus 420. Accordingly, the users may be next to each other in an automobile, or may be quite distant from each other, such as in different sections of a plane, train, spacecraft, office space, building, campus, etc.

In further examples, the audio hub 400 may accommodate conferencing communications, e.g., involving two-way communications between three or more users at once, and may accommodate multiple user conversations at once, e.g., user A communicating with user B while separately but simultaneously users C, D, and E communicate with each other in a conference configuration. Accordingly, any variation of types of communication links, communication zones, and/or quantity of communication links or zones may be supported to accommodate varying system requirements.

In various examples and/or various instances, one or more users may not be associated with a wireless audio device, such as a headphone 122. For example, the driver of a car may be unencumbered with a personal audio device. Accordingly, in various examples, an audio hub in accord with systems and methods described herein may include or accommodate additional audio devices, such as the microphone 112 coupled to the audio hub 100 of FIG. 1 and/or a loudspeaker to accommodate one or more users that are not associated with a personal audio device capable of receiving and/or providing audio signals from or to the user.

Figure 5:
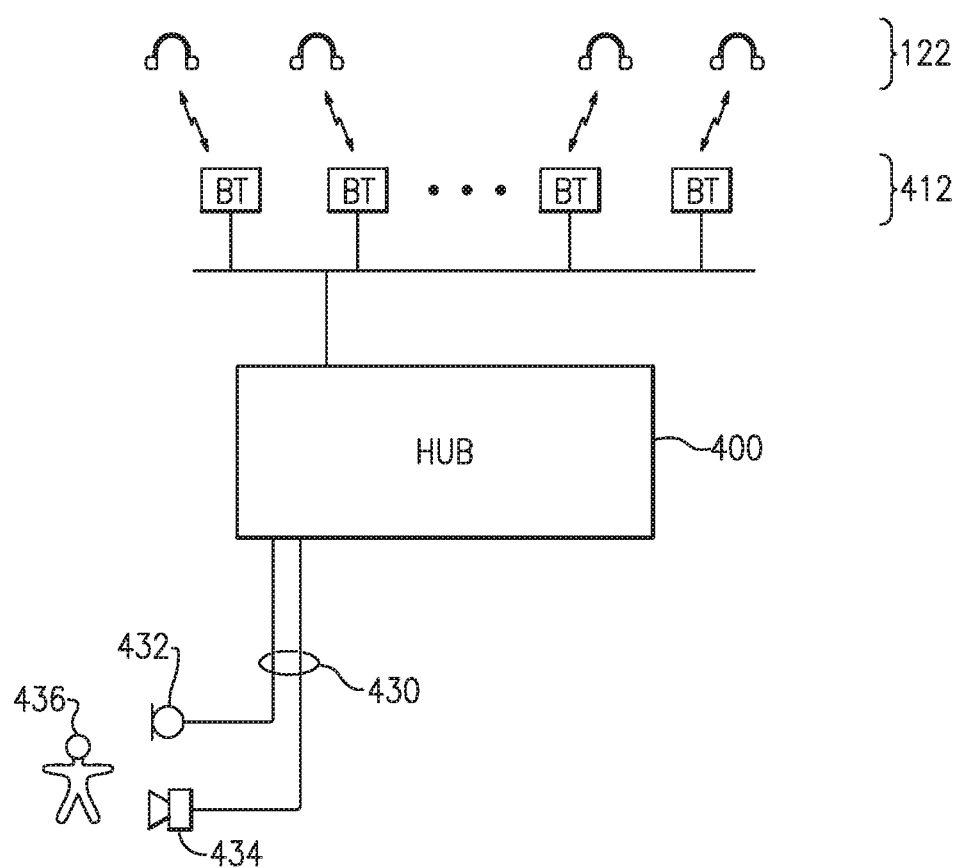
FIG. 5 is a schematic diagram of a further example audio hub.

For example, and with reference to FIG. 5, the audio hub 400 is shown with an additional audio interface 430 coupled to a microphone 432 and a loudspeaker (e.g., an acoustic driver) 434 to accommodate bi-directional audio communication with a user 436. In various examples, the loudspeaker 434 may include numerous loudspeakers, and/or the microphone 432 may include numerous microphones, e.g., that may be further processed as a microphone array. The loudspeaker 434 and the microphone 432 provide and receive, respectively, acoustic signals to or from the user 436. Accordingly, the user 436 may initiate a communication with one or more of any other users, e.g., associated with any of the coupled audio devices, such as the headphones 122, or vice versa. In various examples, the microphone 432 and the loudspeaker 434 may be associated with a passenger position of a vehicle, e.g., where the user 436 may be expected to be, such as various positions in a car. In some examples, audio content may be distributed by the audio hub 400 to various loudspeaker(s), similar to the loudspeaker 434, to the environment generally (without regard to an expected position of a user), such as the sound system of an automobile.

Figure 6:
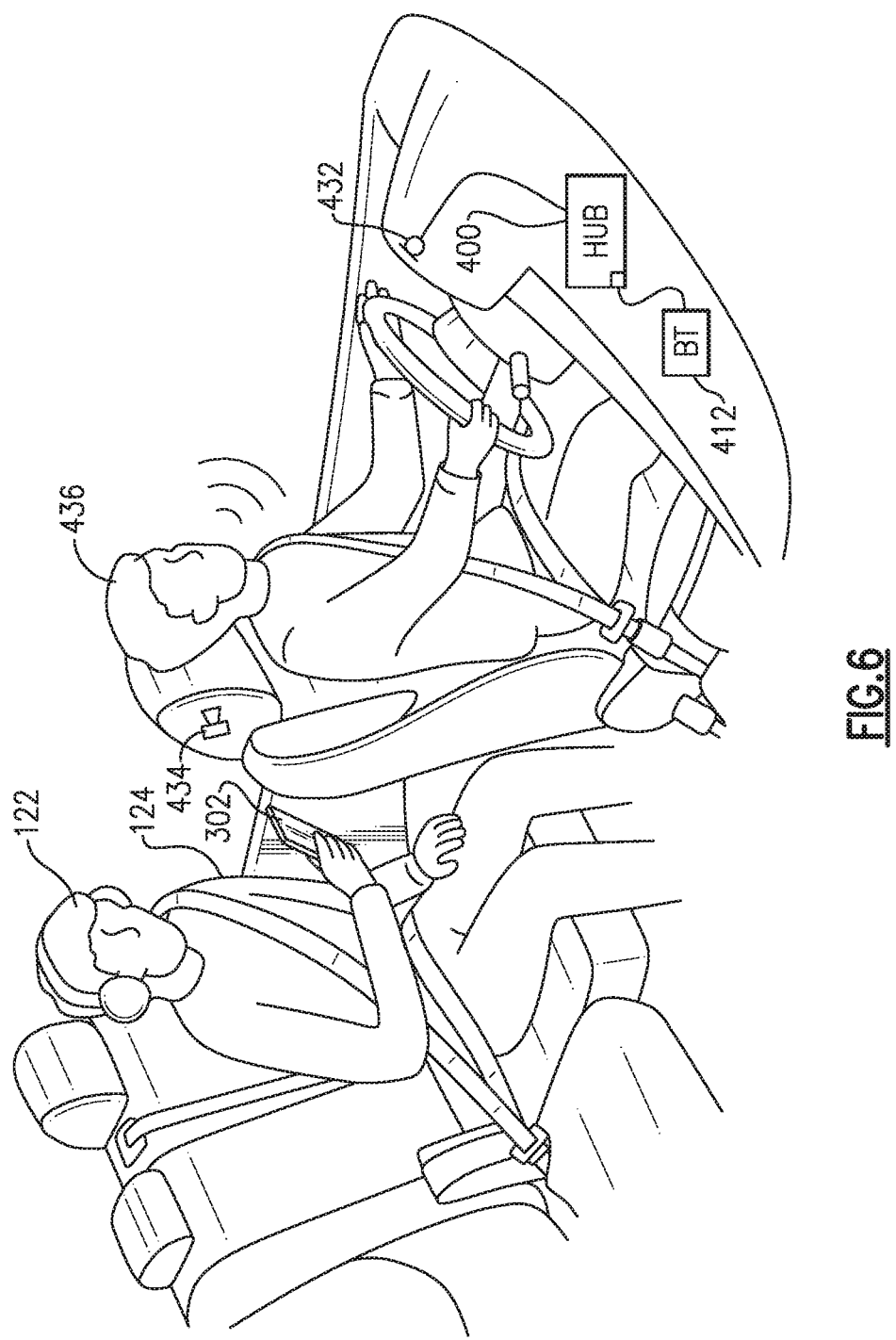
FIG. 6 is a perspective view of an example use case of the audio hub of FIG. 5.

FIG. 6 illustrates such a scenario in which the user 436 does not use a personal audio device, and is an automotive example wherein the driver is the user 436 who communicates with other users via an audio interface 430 of the audio hub 400. This example is similar to that of FIG. 2, except that the user 436 may receive audio via the loudspeaker 434 rather than (or in addition to) directly from the other user, e.g., rather than by virtue of being within earshot of the other user. In various examples, such a microphone 432 may be mounted in, attached, or otherwise coupled to a dashboard or other component of the vehicle, and such a loudspeaker 434 may be mounted in, attached, or otherwise coupled to a headrest, seat, or other component of the vehicle, e.g., near the driver, e.g., the user 436.

In another example, the user 436, e.g., the driver, may communicate with a second user 124 by, e.g., selecting a respective option from a user interface associated with the audio hub 400. Under such operation, the audio hub 400 may convey audio signals from the microphone 432 to the wireless radio 412 that is wirelessly coupled to the headphones 122, so that the second user 124 may hear what the driver says when he speaks. When the second user 124 speaks, the headphones 122 (e.g., a Bluetooth headset) may pick up the user speech via a microphone associated with the headphones 122 and transmit an audio signal to the wireless radio 412, which the audio hub 400 conveys to the loudspeaker 434. For instance, such an example may be particularly beneficial when the vehicle cabin is particularly noisy (e.g., a convertible with the top down, other audio playing through various speakers, or other passengers generating significant noise), or when the second user 124 is further away from the user 436 than is illustrated by FIG. 6 (e.g., the second user 124 being in a third row, or further back in the vehicle, or a larger vehicle such as a bus, RV, semi-truck, etc., or the like).

In some examples, various modes of operation of an audio hub may accommodate the second user 124 initiating the conversation via a user interface associated with the audio hub 400. Such a user interface may also be associated with other devices, such as an app on a smartphone, that provide a graphical user interface, and may be coupled to the audio hub via a wired or wireless link.

In various examples, various modes of operation of an audio hub may accommodate sharing audio content from various devices or various sources, e.g., conveying audio content to other users via the audio hub 400. For instance, and with continued reference to FIG. 6, the second user 124 may have a device 302, such as a personal device like a smartphone, media player, tablet, or the like, from which the second user 124 may be listening to audio content. The device 302 may be coupled to the headphone 122 via a wired or wireless link. In various examples, any of the user 436, the second user 302, or another user, may initiate content sharing, e.g., via a user interface associated with the audio hub 400, which may in some examples include an app on the device 302. In response to such a user selection, various procedures may be implemented in various examples to provide the audio content (from the device 302) to the audio bus 400.

In some examples, the headphone 122 may receive the audio content via existing link (such as Bluetooth wireless, wired, etc.) with the device 302 and may forward or otherwise share or send the audio content to the audio hub 400 via the wireless interface 412 to which the headphone 122 is coupled. In other examples, the second user 124 may be prompted to manage the device 302 to establish a link (such as a wireless link) to the audio hub 400 and to provide the audio content. In other examples, a user may have previously established a wireless link between the device 302 and the audio hub 400, and the audio hub 400 may communicate with the device 302 to command or control the device 302 to share the audio content with the audio hub 400. Accordingly, the audio hub 400 may remember prior connections and prioritize them based upon previous history, e.g., most recently used, etc., in various examples. In some examples, an app on the device 302 may provide command and control of the audio hub 400, and user selection of an option to share audio content on such an app (on the device 302) may natively include sharing the audio content from the devise 302 to the audio hub 400, e.g., via the app and/or from another app that may be the source of the audio content on the device 302. Accordingly, audio content from the device 302 may be provided to the audio hub 400 in numerous ways, and those of skill in the art, with the benefit of this disclosure, will understand these and other methods.

In such a sharing scenario, the second user 124 may continue to receive and listen to the audio content via the headphones 122. In some examples, the shared audio content may be provided by the device 302 simultaneously to each of the headphones 122 and the audio hub 400. In some examples, the shared audio content may be provided by the device 302 to the headphones 122 and the headphones 122 may provide the audio content to the audio hub 400. In some examples, the shared audio content may be provided by the device 302 to the audio hub 400, and the audio hub 400 may provide the shared audio content to the headphones 122.

In various examples, shared audio content may be provided by the audio hub 400 to various users. Accordingly, the audio hub 400 may provide the audio content to the loudspeaker 434 for the user 436 to hear. Additionally, the audio hub 400 may provide the audio content to a further sound system, such as a vehicular infotainment head unit, integrated sound system, amplifier system, equalization systems, etc., for distribution to additional loudspeakers. In some examples, the loudspeaker 434 may be driven by such a further sound system. Additionally, the audio hub 400 may provide the audio content to further audio devices coupled to the audio hub 400, e.g., via wireless links, such as the various headphones 122 (of FIG. 5) associated with various other users. As above, such wireless links may be Bluetooth wireless links, for example.

In some examples, the audio hub 400 may include delay components to be applied to audio that is distributed by the audio hub 400. For example, in some instances, the audio hub 400 may provide audio content to audio devices coupled by wireless links while simultaneously providing the audio content to various loudspeakers and/or other sound systems. Such wireless links may induce processing delays (e.g., audio compression, transmission, reception, synthesis, etc.) that could cause acoustic rendering by the wireless audio devices to be out of sync with that produced by loudspeakers and/or other sound systems. Accordingly, the audio hub 400 may induce additional delay to audio signals provided to various outputs, e.g., loudspeakers and other sound systems, at least when the audio signal is also provided to outputs that may include processing lag, such as a Bluetooth wireless link. Such additional delay may be selected, monitored, and/or controlled to achieve synchronized audio rendering by the various devices.

Figure 7:
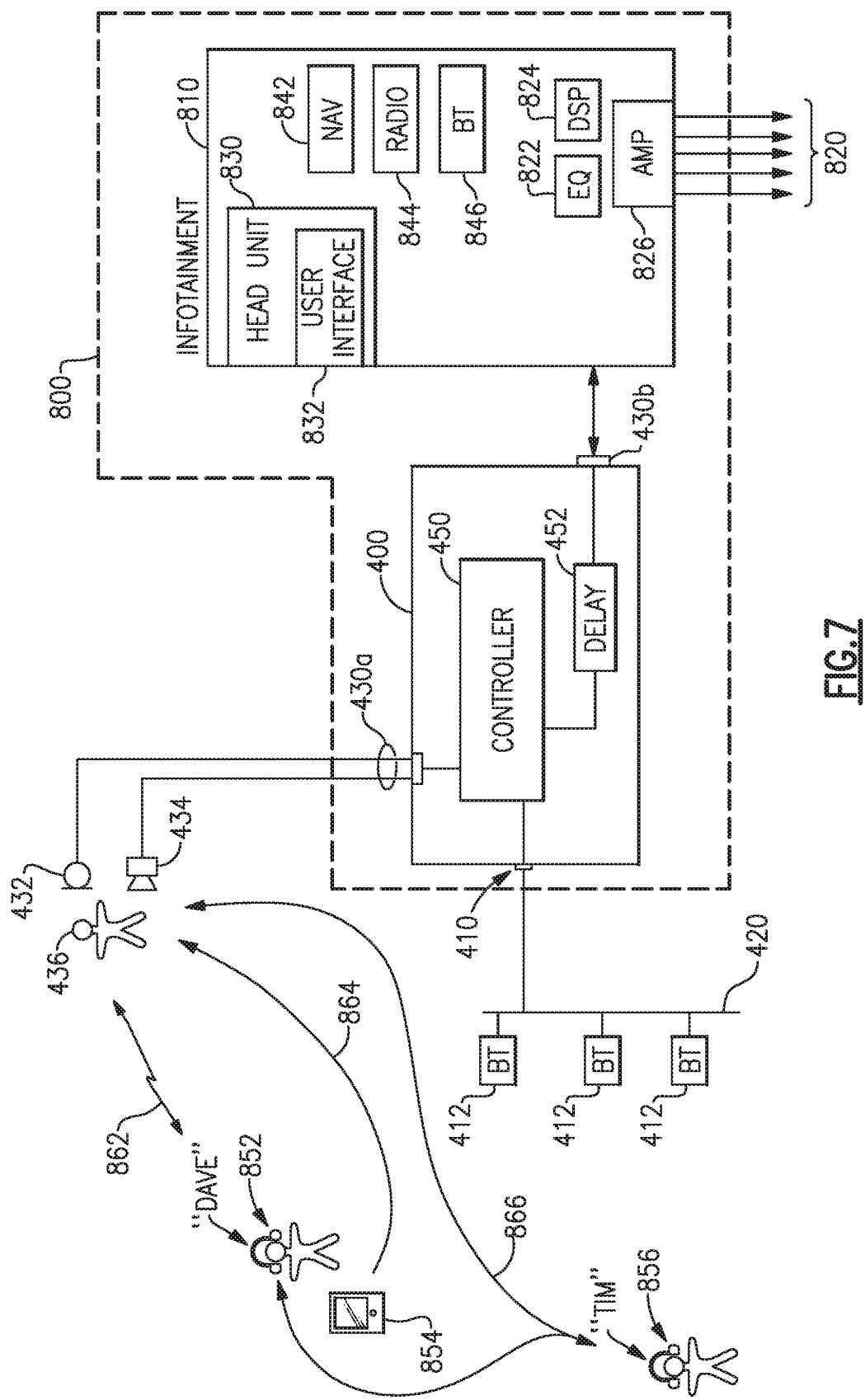
FIG. 7 is a schematic diagram of a further example audio hub in various example use cases.

FIG. 7 illustrates an example of at least one audio system 800 in which an audio hub in accord with systems and methods described herein may be used or incorporated with a further sound system. In the example shown in FIG. 7, the audio hub 400 is used with an infotainment system 810, such as in an automobile, but may be used with or incorporated in to any suitable sound system, including home sound systems, portable sound systems, professional sound systems, public address (PA) systems, etc., and in some examples may be used with or incorporated in to sound systems associated with various vehicles and modes of transportation, such as automobiles, trains, planes, spacecraft, and the like. In various examples, the audio hub 400 may be used with a sound system, e.g., infotainment system 810, or may be incorporated with such a sound system, e.g., a unified version of the audio system 800 that includes the audio hub 400 with various additional sound system components.

In the example audio system 800, the infotainment system 810 may include speaker outputs 820 and may include various components such as equalizer(s) (EQ) 822, digital signal processor(s) (DSP) 824, amplifier(s) 826, and the like, as are known in the art for providing output signals to speakers. The infotainment system 810 may also include a head unit 830 that generally houses various components and may include and/or be coupled to a user interface 832, which may include a display, touchscreen, buttons, knobs, and the like, and which may include various software components for interaction with the user. The infotainment system 810 may also include and/or be coupled to various audio sources, such as navigation (NAV) 842, radio(s) 844, and wireless interface(s) 846 (e.g., Bluetooth radio to which a user's smartphone may be coupled), storage media, interfaces for removable storage media, and the like.

The audio hub 400 may be coupled to or incorporated with the infotainment system 810 in various ways. As shown in FIG. 7, the audio hub 400 includes an interface 410 that couples to an audio bus 420, as described above, that further couples to one or more wireless interfaces 412. The audio hub 400 also includes an audio interface 430*a* coupled to the microphone 432 and the loudspeaker 434, as described above, that provide and receive acoustic signals to or from the user 436. The audio hub 400 also includes an audio interface 430*b* coupled to the infotainment system 810. Accordingly, the audio hub 400 may be configured to treat the infotainment system 810 as an additional "user" to or from which audio may be distributed and sourced. In various examples, the audio hub 400 may appear to the infotainment system 810 as an additional sound source or sink, e.g., configured to receive audio content from the audio hub 400 and/or provide audio content to the audio hub 400, similar in manner to, e.g., a user's cell phone that may be synced to the infotainment system 810. In some examples, the wireless interface(s) 846 associated with the infotainment system 810 may be one or more of the wireless interfaces 412 coupled to the audio bus 420.

It should be understood that audio provided to and/or received from the audio hub 400 may be of various quality and/or characteristics, such as monaural, binaural, multi-channel (e.g., surround), analog or digital, with varying degrees of fidelity, compression, dynamic range, bit-depth, frequency range, sampling rate(s), etc., as may be suitable for various applications and/or changing system requirements.

The configuration of the audio system 800 as shown in FIG. 7 is merely one example of such a system in accord with systems and methods described herein. In various examples, for instance, the loudspeaker 434 may include one or more speakers driven by the speaker outputs 820 of the infotainment system 810 and/or the microphone 432 may be one or more microphones coupled to the infotainment system 810, e.g., as an additional audio source, and may include an array of microphones. Accordingly, the audio interface 430*a* that provides or receives signals to or from the user 436 may be integrated with the audio interface 430*b*, such that signals to or from the user 436 may be further conveyed by the infotainment system 810.

In various examples, the audio interface 430*b* may be any type of interface supported by the infotainment unit capable of conveying audio content, such as a Bluetooth interface, a universal serial bus (USB) interface, or similar.

Additionally, the audio interface 430b may be an audio bus. Accordingly, the audio interface 430b may be incorporated into the audio bus 420. Thus, in some examples, the audio hub 400 may include a single interface 410 that couples to the audio bus 420 and may thereby be coupled to the infotainment system 810, and/or may further be coupled to the microphone 432 and the loudspeaker 434 via the audio bus 420.

According to various examples, the audio hub 400 includes a controller 450, which may include a processor generally and/or may include a digital signal processor (DSP). The controller 450 may be configured to include, or to control, a delay 452 that may be controlled to induce a delay in audio signals provided for various output modalities that have low latency so that rendering of audio content may be synchronized with other output modalities that may have higher latency (e.g., wireless links).

In certain examples, the audio hub 400 may be integrated with the infotainment system 810. In such examples, the functions of the controller 450 (and the delay 452) may be integrated with and/or incorporated in the functions of the DSP 824 or other processor(s) associated with the infotainment system 810. In other examples, the audio hub 400 may be a stand-alone device and/or may be a portable device that may be coupled to the infotainment system 810 and/or may operate in parallel with but separate from the infotainment system 810.

In some examples, the audio hub 400 may be implemented as specialized processor instructions and configuration parameters loadable to a processor associated with the infotainment system 810, such as loadable to the DSP 824 or another processor, or any combination of one or more DSP's and/or one or more other processors. Such specialized processor instructions (which may include DSP instructions and/or configuration parameters) may be stored on a storage media or memory, and when executed may cause the infotainment system 810 to perform the operations of an audio hub 400 as described herein, such as distributing audio between various wired and wireless audio devices (e.g., headphones 122, audio interface(s) 430, etc.), as may be selected by a user through a user interface (e.g., user interface 832 and/or a remote app or the like). Accordingly, the infotainment system 810 may communicate over an audio bus (e.g., the audio bus 420) to control and distribute audio signals among various wireless interface(s) 412 and/or various microphones and loudspeakers, and in some examples the infotainment system 810 may distribute audio to wireless audio devices, such as headphones 122, using a hands-free profile, advanced audio distribution profile, or the like.

With continued reference to FIG. 7, some example scenarios of use and/or modes of operation are described. For example, the user 436 may receive or provide acoustic signals via the loudspeaker 434 and the microphone 432, and may communicate with and/or share audio content with additional user devices, such as a first audio device 852 (e.g., headphones), a smart device 854 (e.g., smartphone), and a second audio device 856 (e.g., headphones), and/or the sound system provided via the infotainment system 810, e.g., vehicle loudspeakers coupled to the speaker outputs 820. For the sake of these examples, the first audio device 852 may be worn by a first user named Dave and the smart device 854 may be Dave's smartphone. The second audio device 856 may be worn by a second user named Tim.

In various examples, the audio hub 400 may include configuration options to assign an identifier (e.g., a name, a "tag," etc.) to the various devices. For instance, the first audio device 852 may be tagged as "Dave" and the second audio device 856 may be tagged as "Tim." Accordingly, the user 436 may use custom identifiers to be associated with the first and second audio devices 852, 856, or other devices (e.g., smart device 854), which may be spoken out loud in some examples. Accordingly, the user 436 may select an option (e.g., via a user interface) to speak with Dave or Tim, and may identify which of Dave or Tim he wants to speak. Selecting an option to speak with another user may, in various examples, involve making a selection on a touchscreen, for instance, and may involve selecting "Dave" or "Tim" from among options presented on the touchscreen. In some examples, a toggle or button on a console, steering wheel, or other convenient location may indicate the user's desire to make an audio connection with another user. In some examples, various aspects of selecting to speak with another user may involve voice recognition functions, e.g., such that the user 436 may speak the name "Dave" or "Tim" after having selected the option to speak with another user. In some examples, voice recognition functions may include a command or wake-up word. For example, a wake-up word may be "hey" and the audio hub 400 may be configured to interpret the wake-up word as a command to initiate a conversation with another user. Accordingly, the user 436 could speak, "Hey, Dave" and in response the audio hub 400 may initiate a conversation between the user 436 and the first audio device 852. In some examples, the audio hub 400 may initiate the conversation by signaling to the first audio device 852 that there is an incoming call, e.g., in accord with a hands-free profile, and in response to which the first audio device 852 (optionally upon prompting and/or acceptance by Dave) may pause any other audio (e.g., Dave may be actively listening to audio content from the smart device 854) and may "accept" the incoming call, thereby establishing an active audio link with the audio hub 400, via a respective wireless interface 412. Accordingly, an audio communication link 862 may be established between Dave and the user 436.

In another example, Dave may be listening to audio content, e.g., via the first audio device 852, from the smart device 854 and may want to share the audio content with other users, such as Tim or the user 436 or all the passengers in the vehicle (e.g., through loudspeakers coupled to the speaker outputs 820). In some examples, Dave may make selections on the smart device 854, such as via an app, to cause the smart device 854 to couple with the audio hub 400 (e.g., to establish a wireless link with a respective wireless interface 412) and in response to which the audio hub 400 may initiate active audio distribution from the smart device 854 to the various selected audio outputs. Accordingly, audio content may be distributed via an audio link 864. In various examples, the first audio device 852 may continue to play the audio content by virtue of the audio hub 400 distributing the audio content back to the first audio device 852, e.g., without regard to the fact that the smart device 854 and the first audio device 852 are both associated with Dave. In other examples, the smart device 854 may be capable of sending the audio content to each of the first audio device 852 and the audio hub 400 simultaneously. In other examples, the smart device 854 may not be coupled to a wireless interface 412 but, e.g., the first audio device 852 may forward the audio content received from the smart device 854 to the audio hub 400.

In further examples, conferencing conversations may be initiated, with audio distributed accordingly via the audio hub 400, in like manner. For example, an audio communication link 866 may be established that includes the user 436 and both Dave and Tim, but may not include other users in the vehicle (not shown). For example, an existing audio communication link 862 may be converted into the audio communication link 866 by additionally selecting "Tim" by voice command, or by touchscreen selection (e.g., one-touch), or other forms of user interaction with the audio hub 400.

Additionally, audio content "sharing" may be in various forms. For instance, the radio 844 may be an audio source selected to be distributed to the first audio device 852, such that Dave can listen to radio program content, for example while the radio volume for the speaker outputs 820 may be turned down and/or while the user 436 is holding a phone conversation via the wireless interface 846 through the speaker outputs 820. As another example, the radio 844 may be an audio source for Dave, exclusive of navigation prompts of the navigation 842 system, while the same radio program may play through the speaker outputs 820 (or through the loudspeaker 434) inclusive of navigation prompts. In yet another example, the radio 844 may be an audio source for Dave for a particular radio program (e.g., a radio station) while other users and/or the speaker outputs 820 play an alternate radio program (e.g., a different radio station).

In various examples, the audio hub 400, by itself or coupled to or integrated with a further sound system such as the infotainment system 810, may be used in various ways and for various applications. For example, Dave and Tim of FIG. 7 may use a communication link between their respective headphones 852, 856 for side-by-side gaming, e.g., to communicate with each other while participating in a virtual game system, for instance. In other examples, user's may participate in a karaoke session, such as by playing their singing voices through vehicle loudspeakers, or to have a limited karaoke session to play their singing voices only in their respective headphones (e.g., among the participants, not all individuals). In some examples, members of a household may hold discussions with each other from different rooms, without having to gather in the same location or shout through the house, and without having to disturb or include other members of the household, who may be doing other things. Similarly, co-workers may communicate remotely via respective audio devices and via an audio hub in accord with those described herein, e.g., from their respective cubicles or offices, and potentially at distances from each other on a floor of a building, or on different floors, or between buildings in a campus, such as via multiple audio hubs that may be linked by additional interfaces for extended range.

Accordingly, the audio hub 400 enables various audio source and destination combinations and options among various users, whether each user has a personal audio device or is simply present in the acoustic environment of the audio system 800.

In some examples, the audio hub 400 may communicate with other devices and/or sound systems via a cloud or other network interface. The audio hub 400 may also accommodate transition of wireless links to various audio devices (e.g., headphones 122) as they enter or exit range of the audio hub 400 and/or as they enter or exit range of other devices. For example, a family member may have a headphone 122 may be paired with a sound bar at home and with the audio hub 400 in a vehicle, and either of the sound bar or the audio hub 400 may monitor for the presence of the headphone 122 and may cause a seamless transition from the audio hub 400 to the sound bar, or vice versa, such as when the user arrives home in the car. Various examples may include polling for the headphone 122, or may include Bluetooth low energy (BLE) pulsing, and/or may include communication (e.g., via the cloud) between the audio hub 400 and the sound bar or other device to which a transition may be desirable based on user activity.

Figure 8:
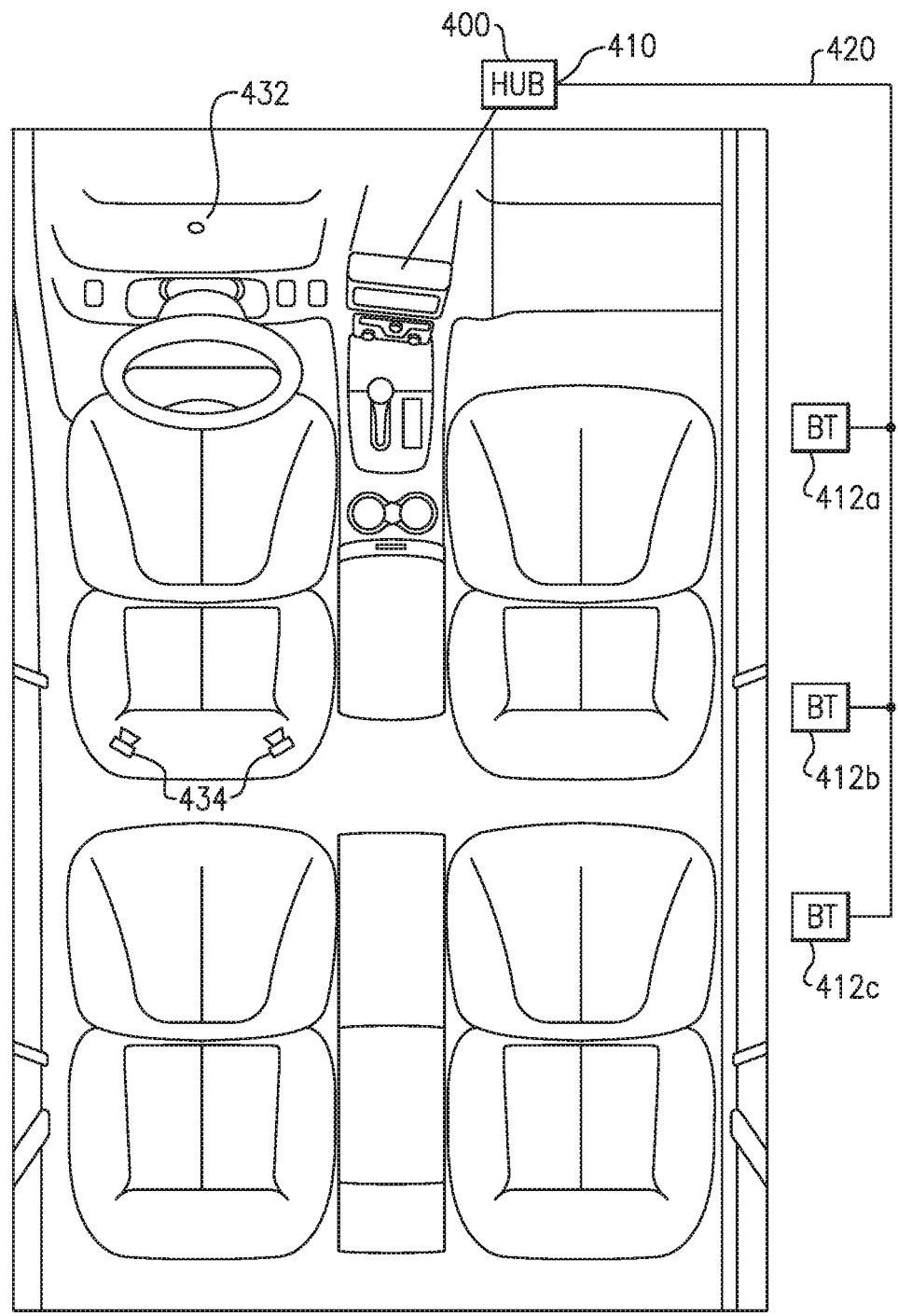
FIG. 8 is an overhead view of a further example use case of an audio hub.

FIG. 8 illustrates an example acoustic environment in which various components of the audio system 800 may operate. The example environment is an automobile having a driver's seat and a number of passenger positions. The loudspeaker 434 and the microphone 432 are positioned to acoustically provide or capture, respectively, audio to and from the driver, e.g., the user 436. The audio hub 400 may be coupled to or incorporated into an infotainment system 810, or a head unit thereof, a number of wireless interfaces 412 may be positioned in the vehicle to provide wireless connectivity with audio devices located at various passenger positions. In various examples, each of the wireless interfaces 412 may be coupled to an audio bus 420, such as an automotive audio bus (A2B) as discussed above. In some examples, one or more of the wireless interfaces 412 may be directly coupled or wired to the audio hub 400 (or an infotainment system) and not be coupled via an audio bus, and/or various of the wireless interfaces 412 may be integrated with the audio hub 400 (or the infotainment system).

In various examples, an audio hub in accord with the systems and methods described herein may take various form factors. For instance, a portable audio hub may include two or more wireless interfaces, such as Bluetooth radios, and may provide selective communication links between various users (e.g., between user's audio devices, such as headphones). In some examples, an audio hub may include one or more audio interfaces for coupling to various microphones and/or loudspeakers.

In some examples, the audio hub may include such microphone(s) or loudspeaker(s). In some examples, the audio hub may be incorporated into a personal audio device, such as a headphone, tabletop speaker, portable speaker, home sound system, or the like. For example, a headset may include such an audio hub, e.g., the headphone speaker(s) and microphone(s) being equivalent to the loudspeaker 434 and the microphone 432, for instance, and to which other user's audio devices may couple, e.g., via wireless links. In various examples, an audio hub in accord with systems and methods described herein may have extended ranges such that, for example, various users may be coupled to the audio hub (e.g., via wireless links) while distributed across a larger area. Example environments and use scenarios may include planes and trains (users seated at various locations), tour groups (users roaming along a street or around an exhibit), office spaces (users in various cubicles, conference rooms, floors, buildings, etc.), security (personnel roaming around rooms and buildings), industrial environments (manufacturing, noisy machinery), restaurants (wait-staff, fast food communication, drive-through ordering, etc.), and others.

In some examples, numerous audio hubs may be configured to be coupled to each other via wired or wireless means, e.g., to extend the reach of an audio distribution. In some examples, an audio hub may include a microphone and a wireless interface and may be usable to enhance the hearing of the user. For instance, the audio hub may pick-up audio via the microphone and provide it to a user's headphone, e.g., coupled by a wireless link, so that the user may hear the audio better, e.g., louder or at a distance such as from the front to the back of a classroom. For example, the audio hub may act as a remote microphone for listening on a wireless headset.

Figure 9:
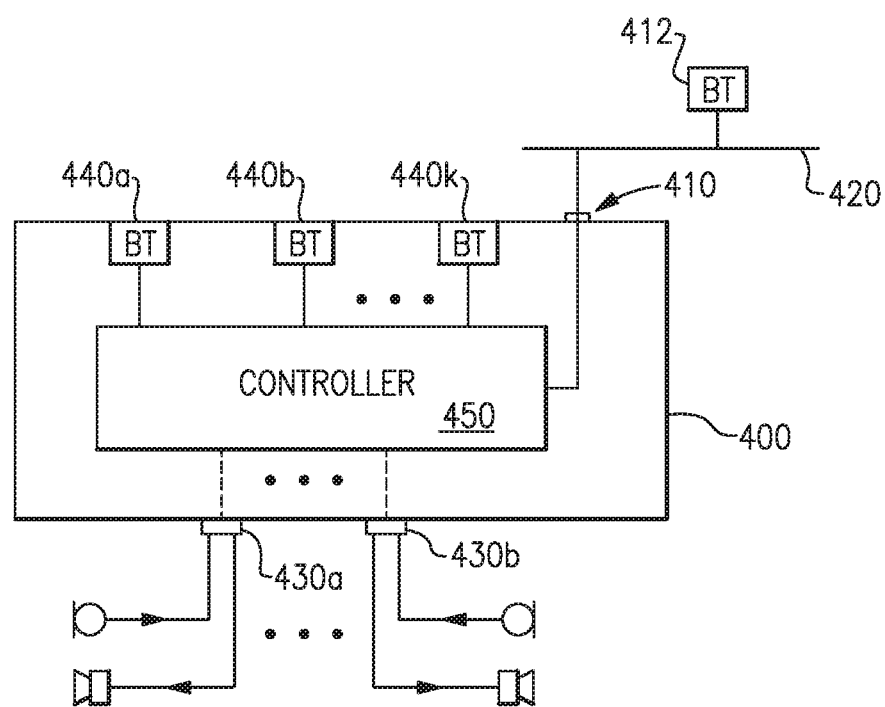
FIG. 9 is a schematic diagram of a further example audio hub.

FIG. 9 illustrates further example aspects that may be included with the audio hub 400. FIG. 9 in particular illustrates that the audio hub 400 may have one or more included wireless interfaces 440, in addition to or instead of the interface 410 to which an audio bus 420 may couple to the wireless interface(s) 412. Accordingly, the controller 450 may include various connections or couplings to the wireless interfaces 440 that may or may not be coupled to the interface 410 and/or the audio bus 420, in various examples. FIG. 9 also illustrates that the audio hub 400 may have multiple audio interfaces 430 that may couple to various microphones and loudspeakers, e.g., for various acoustic locations, and/or may couple to various external sound systems.

In various examples, a user interface (for interaction with the controller 450, see FIG. 9) may include remote portions. With reference to FIG. 7, the smart device 854 may include a software application providing a user interface that provides some or all of the functionality of the user interface 832, and may be provided in addition to or instead of the user interface 832. A user interface may allow for communication of user controls, commands, and/or adjustments to audio settings.

Figure 10:
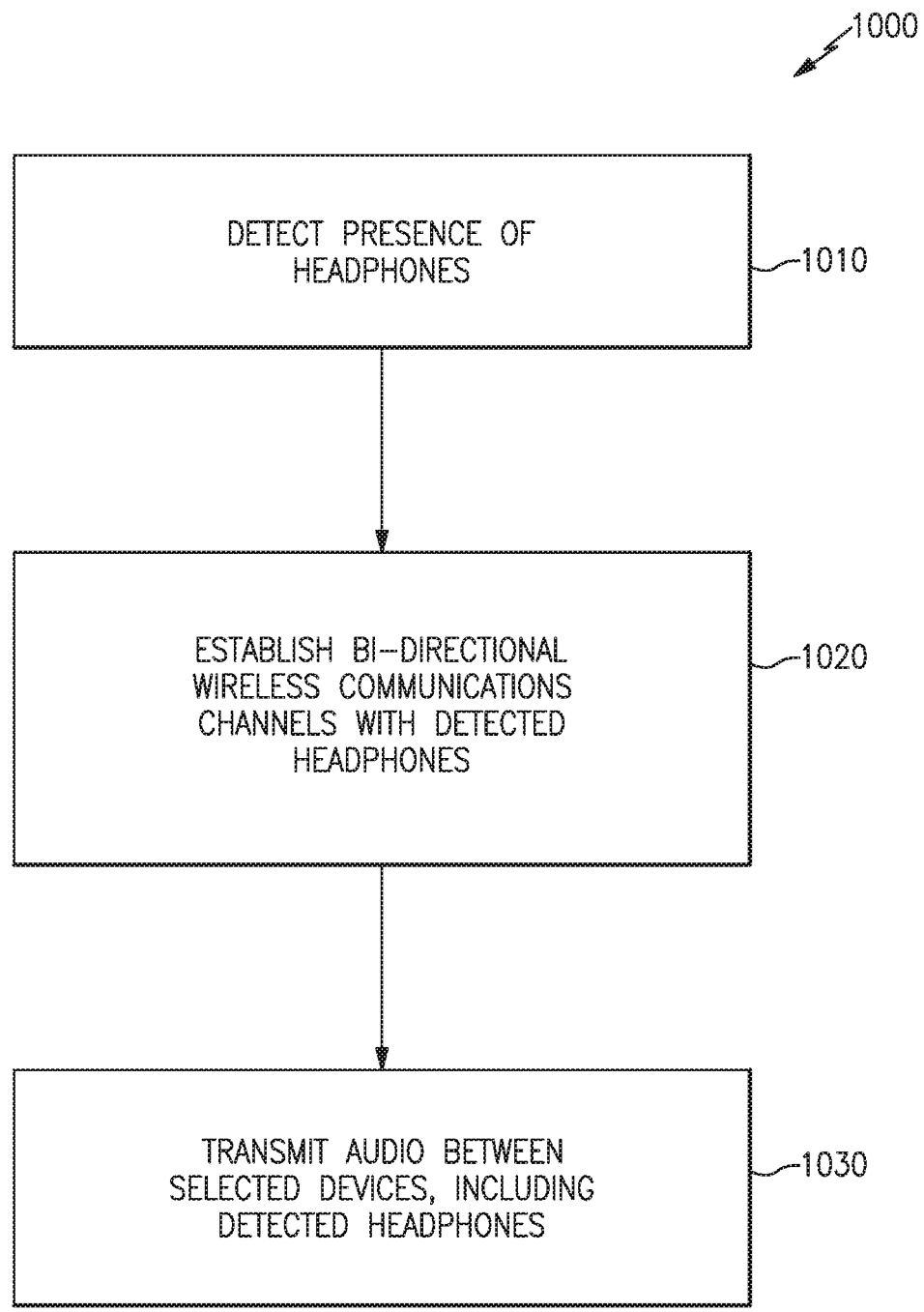
FIG. 10 is a flow diagram of an example method of operation of an audio hub.

FIG. 10 illustrates an example method 1000 for distributing audio, e.g., in a vehicle, that includes an audio hub in accord with examples described here. As described above, the audio hub may be in electronic communication with an infotainment head unit, a vehicle microphone, and/or speakers located proximal to an intended seating position of a driver of the vehicle. The audio hub may detect (block 1010) a presence of one or more headphones, e.g., within a cabin of the vehicle. For example, detection may be by virtue of prior pairing and/or may involve Bluetooth low energy (BLE), for example. Conventional techniques for detecting presence of headphones previously-paired with the hub and/or for pairing with new headphones can be used. The audio hub establishes respective bi-directional wireless communication channels (block 1020) between each of the one or more headphones and the audio hub. Additionally, the audio hub transmits audio between devices (block 1030) selected from a group comprising the infotainment head unit, the vehicle microphone, the driver speakers, and the one or more headphones.

Embodiments of the systems and methods described above may include computer components and computer-implemented steps that will be apparent to those skilled in the art. For example, it should be understood by one of skill in the art that computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

Any of various functions described, including those of the example method 1000 or similar, and any components of an audio device, such as the audio hub 400, and its controller, e.g., the controller 450, or similar, may be implemented or carried out with use of a microprocessor, a logic controller, logic circuits, a digital signal processor (DSP), or the like, or any combination of these, and may include analog circuit components, digital circuit components, and/or other components with respect to any particular implementation. Any suitable hardware and/or software, including firmware and the like, may be configured to carry out or implement components of the aspects and examples disclosed herein, and various implementations of aspects and examples may include components and/or functionality in addition to those disclosed. Additionally, statements herein that an audio device does or takes an action may be understood to mean that a controller of the audio device may do or take the action.

Figure 11:
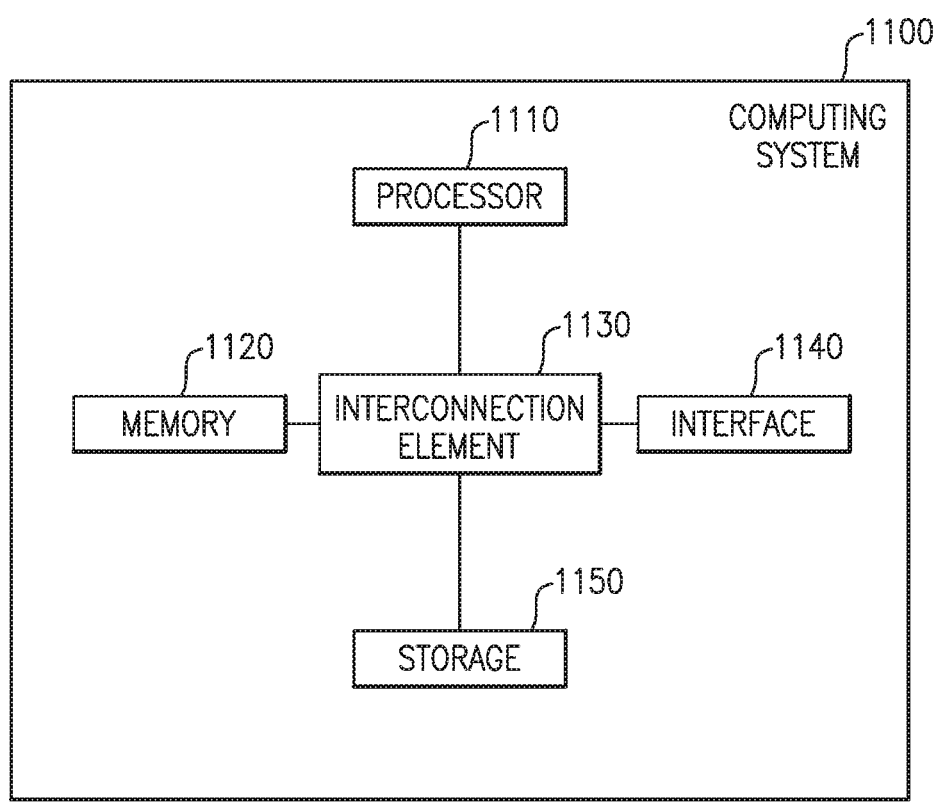
FIG. 11 is a schematic diagram of an example computing system.

Referring to FIG. 11, there is illustrated a block diagram of a computing system 1100, in which various aspects and functions may be practiced. As illustrated in FIG. 11, at least one computing system 1100 includes a processor 1110, a memory 1120, an interconnection element 1130, an interface 1140 and a data storage element 1150. To implement at least some of the aspects, functions, and processes disclosed herein, the processor 1110 performs a series of instructions that result in manipulated data. The processor 1110 may be any type of processor, multiprocessor, controller, field programmable gate array (FPGA), application specific integrated circuit (ASIC), or digital signal processor (DSP). The processor 1110 is connected to other system components, including one or more memory 1120 devices, by the interconnection element 1130.

The memory 1120 may store one or more programs (e.g., sequences of instructions coded to be executable by the processor 1110) and/or data, which may include device identifiers and bonded keys, for example, during operation of the computing system 1100. Thus, the memory 1120 may be a relatively high performance, volatile, random access memory 1120 such as a dynamic random access memory 1120 ("DRAM") or static memory 1120 ("SRAM"). However, the memory 1120 may include any device for storing data, such as a disk drive or other nonvolatile storage device.

Components of the computing system 1100 are coupled by an interconnection element 1130. The interconnection element 1130 may include any communication coupling between system components such as one or more physical busses in conformance with specialized or standard computing bus technologies or interfaces, and may include differing technologies to couple to different components. The interconnection element 1130 enables communications, including instructions and data, to be exchanged between system components of the computing system 1100.

The computing system 1100 may include one or more interface 1140 devices such as input devices, output devices and combination input/output devices. Interface 1140 devices may receive input or provide output. More particularly, output devices may render information for external presentation. Input devices may accept information from external sources. Examples of interface 1140 devices include keyboards, mouse devices, trackballs, microphones, touch screens, printing devices, display screens, speakers, network interface cards, storage devices, etc. Interface 1140 devices allow the computing system 1100 to exchange information and to communicate with external entities, such as users and other systems.

The data storage element 1150 includes a computer readable and writeable nonvolatile, or non-transitory, data storage medium in which instructions may be stored that define a program, or other object, that is executed by the processor 1110. The data storage element 1150 also may include information that is recorded, on or in, the medium, such as device identifiers and bonded keys, for example, and processed by the processor 1110 during execution of one or more programs. More specifically, the information may be stored in one or more data structures specifically configured to conserve storage space or increase data exchange performance. The instructions may be persistently stored as encoded signals, and instructions may cause the processor 1110 to perform any of the functions described herein. The medium may, for example, be optical disk, magnetic disk or flash memory 1120, among others. In operation, the processor 1110 or some other controller causes data to be read from the storage element 1150 into another memory, such as the memory 1120, that allows for faster access to the information by the processor 1110 than does the storage medium included in the data storage element 1150. A variety of components may manage data movement between the storage element 1150 and other memory elements and examples are not limited to particular data management components. Further, examples are not limited to a particular memory system or data storage system.

Although the computing system 1100 is shown by way of example as one type of computing system 1100 upon which various aspects and functions may be practiced, aspects and functions are not limited to being implemented on the computing system 1100 as shown in FIG. 11. Various aspects and functions may be practiced on one or more computers having different architectures or components than that shown in FIG. 11. For instance, the computing system 1100 may include specially programmed, special-purpose hardware, such as an application-specific integrated circuit ("ASIC") tailored to perform a particular operation disclosed herein. Another example may perform the same operation using a grid of several computing devices running operating systems with various processors and/or several specialized computing devices running proprietary hardware and operating systems.

The computing system 1100 may be a computing system 1100 including an operating system that manages at least a portion of the hardware elements included in the computing system 1100. In some examples, a processor or controller, such as the processor 1110, executes an operating system. In other examples the processor 1110 may include other forms of logic, such as an ASIC, FPGA, or DSP, and may have other forms of instruction sets, and may or may not execute an operating system.

In some examples, the components disclosed herein may read parameters that affect the functions performed by the components. These parameters may be physically stored in any form of suitable memory including volatile memory (such as RAM) or nonvolatile memory (such as flash memory). In addition, the parameters may be logically stored in a proprietary data structure (such as a database or file defined by an application) or in a commonly shared data structure (such as an application registry that is defined by an operating system). In addition, some examples provide for both system and user interfaces that allow external entities to modify the parameters and thereby configure the behavior of the components.

Various examples of the methods and apparatuses discussed herein are not limited in application to the details of construction and the arrangement of components set forth in the above descriptions or illustrated in the accompanying drawings. The methods and apparatuses are capable of implementation in various embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An audio system for use with an audio device, comprising:
   an audio input associated with a first user and configured to receive an input signal from a microphone, the input signal including audio content from the first user;
   a plurality of short-range wireless audio interfaces each associated with one of a plurality of other users, each of the short-range wireless audio interfaces configured to couple wirelessly to the audio device and to provide an output signal for rendering into an acoustic signal by the audio device; and
   a controller coupled to the audio input and the plurality of short-range wireless audio interfaces, the controller being configured to cause the audio device to prompt a second user to accept a call from the first user such that the audio device pauses other content, and the controller being further configured to receive the input signal and to selectively provide the audio content in the output signal to one or more of the plurality of short-range wireless audio interfaces.

2. The audio system of claim 1 further comprising an audio output configured to provide a second output signal to a loudspeaker, the controller being further configured to selectively receive a second input signal from a selected one of the plurality of short-range wireless audio interfaces and to provide the second output signal to the audio output based upon the second input signal.

3. The audio system of claim 1 wherein the controller is further configured to selectively convey audio signals between a plurality of audio devices, each of the plurality of audio devices coupled to at least one of the plurality of short-range wireless audio interfaces.

4. The audio system of claim 3 wherein the controller is further configured to store a name associated with one or more of the plurality of audio devices, and to accept a user selection of one or more of the names from a user interface, and to selectively convey the audio signals between the plurality of audio devices based upon the user selection.

5. The audio system of claim 4 wherein the user selection of one or more of the names from the user interface includes at least one of voice recognition of the one or more names or selection of the one or more names via a touchscreen.

6. The audio system of claim 1 further comprising an infotainment unit of an automobile, the microphone configured to be mounted in the automobile, the controller being coupled to the infotainment unit, and the controller being further configured to selectively convey audio signals between a plurality of devices selected from a group comprising the microphone, any of the plurality of short-range wireless audio interfaces, and the infotainment unit.

7. The audio system of claim 1 wherein the controller is coupled to the plurality of short-range wireless audio interfaces via an audio bus.

8. The audio system of claim 1 wherein the audio input is a wireless audio interface and the controller is coupled to the microphone by the wireless audio interface.

9. An audio system, comprising:
one or more audio interfaces, at least one of the one or more audio interfaces associated with a first acoustic device and configured to couple to one or more wireless audio interfaces each associated with one of one or more additional acoustic devices; and
an audio hub coupled to the one or more audio interfaces, the audio hub configured to detect a presence of the one or more additional acoustic devices via the one or more wireless audio interfaces and to establish a communication channel between the first acoustic device and one or more of the one or more additional acoustic devices such that other audio content is paused on the one or more of the one or more additional acoustic devices when a user calls the one or more of the one or more additional acoustic devices from the first device, and to selectively convey audio content between the first acoustic device and at least one of the one or more additional acoustic devices.

10. The audio system of claim 9, wherein at least one of the one or more additional acoustic devices is in wireless communication with a personal device.

11. The audio system of claim 9, wherein the audio hub is in further communication with a plurality of fixed speakers in a vehicle, wherein at least one of the one or more additional acoustic devices is in wireless communication with a personal device.

12. The audio system of claim 9, wherein conveying the audio content via the audio hub comprises transmitting audio between a microphone and a speaker and one, some, or all of the one or more additional acoustic devices.

13. The audio system of claim 9, wherein conveying the audio content via the audio hub comprises transmitting first audio between the one or more additional acoustic devices while second audio is transmitted between an infotainment head unit and a speaker, the first audio being different from the second audio.

14. The audio system of claim 9, wherein conveying the audio content via the audio hub comprises transmitting first audio between a microphone, a speaker, and at least a first additional acoustic device of the one or more additional acoustic devices; and transmitting second audio between the one or more additional acoustic devices other than the first additional acoustic device, the first audio being different from the second audio.

15. A method for distributing audio that includes an audio hub, a wireless interface, a microphone configured to pick up a first user's voice, and a speaker located proximal to an ear of the first user, the method comprising:
detecting a presence of one or more headphones each associated with one of one or more other users, via the wireless interface;
establishing respective bi-directional wireless communication channels between each of the one or more headphones and the audio hub; and
selectively transmitting audio from the first user via the audio hub between a plurality of devices selected from a group comprising an infotainment head unit, the microphone, the speaker, and the one or more headphones, such that other audio content is paused on one of the plurality of devices when the first user calls the one of the plurality of devices.

16. The method of claim 15, wherein at least one of the one or more headphones is in wireless communication with a personal device, wherein the plurality of devices is selected from the group further comprising the personal device, and wherein transmitting audio via the audio hub further comprises transmitting audio from the personal device to at least one of the one or more headphones or the speakers.

17. The method of claim 15, wherein the audio hub is in further communication with a plurality of fixed speakers in a vehicle, wherein at least one of the one or more headphones is in wireless communication with a personal device, wherein the plurality of devices is selected from the group further comprising the personal device and the plurality of fixed speakers, and wherein transmitting audio via the audio hub further comprises transmitting audio from the personal device to at least some of the plurality of fixed speakers.

18. The method of claim 15, wherein transmitting audio via the audio hub comprises transmitting audio between the microphone and the speaker and one, some, or all of the one or more headphones.

19. The method of claim 15, wherein transmitting audio via the audio hub comprises transmitting first audio between the one or more headphones while second audio is transmitted between an infotainment head unit and the speaker, the first audio being different from the second audio.

20. The method of claim 15, wherein transmitting audio via the audio hub comprises transmitting first audio between the microphone, the speaker, and at least a first headphones of the one or more headphones; and transmitting second audio between the one or more headphones other than the first headphones, the first audio being different from the second audio.

* * * * *